United States Patent [19]

Hidaka et al.

[11] Patent Number: 5,250,101

[45] Date of Patent: Oct. 5, 1993

[54] PROCESS FOR THE PRODUCTION OF FINE POWDER

[75] Inventors: Toshio Hidaka; Takamasa Kawakami; Satoru Makinose, all of Tsukuba, Japan

[73] Assignee: Mitsubishi Gas Chemical Company, Inc., Tokyo, Japan

[21] Appl. No.: 862,218

[22] Filed: Apr. 2, 1992

[30] Foreign Application Priority Data

| | | | |
|---|---|---|---|
| Apr. 8, 1991 | [JP] | Japan | 3-103165 |
| Jul. 23, 1991 | [JP] | Japan | 3-206406 |
| Jul. 23, 1991 | [JP] | Japan | 3-206409 |
| Dec. 9, 1991 | [JP] | Japan | 3-324523 |
| Dec. 9, 1991 | [JP] | Japan | 3-324524 |
| Dec. 9, 1991 | [JP] | Japan | 3-324525 |
| Dec. 9, 1991 | [JP] | Japan | 3-324538 |

[51] Int. Cl.$^5$ .................................................. B22F 9/24
[52] U.S. Cl. ...................................... 75/362; 75/722; 423/592; 502/339
[58] Field of Search ................ 75/362, 413, 721, 722; 423/592; 502/339

[56] References Cited

U.S. PATENT DOCUMENTS 5,030,608 7/1991 Schubert et al. .................... 502/339

FOREIGN PATENT DOCUMENTS 2-277706 11/1990 Japan ................................. 75/362
1109890 4/1968 United Kingdom .
1148512 4/1969 United Kingdom .

OTHER PUBLICATIONS

Armor et al., Materials Letters, vol. 4, No. 8-9, Aug. 1986, pp. 373-376.
Meguro et al., Patent Abstracts of Japan, vol. 15, No. 39, (M-1075) Jan. 30, 1991 JP-A-2 277 706.

*Primary Examiner*—George Wyszomierski
*Attorney, Agent, or Firm*—Wenderoth, Lind & Ponack

[57] ABSTRACT

A process for the production of a fine powder suitable for use in the fields of electronic materials, catalysts, powder metallurgy, pigments and adsorbens. The powder has a primary particle diameter of not more than 0.5 μm, an average secondary aggregate particle diameter of not more than 10 μm and a secondary aggregate particle specific surface area of 2 to 250 m$^2$/g, and is produced by a process comprising heating an organic acid metal salt in the presence of palladium, which lowers the thermal decomposition temperature of the salt, at a temperature elevation rate of 0.5° to 20°C./minute and thermally decomposing the organic acid metal salt in the presence of the palladium in the temperature range of not higher than 400°C.

9 Claims, 2 Drawing Sheets

PROCESS FOR THE PRODUCTION OF FINE POWDER

FIELD OF THE INVENTION

The present invention relates to a process for the production of a fine metal or metal oxide powder having a primary particle diameter of not more than 0.5 µm, an average secondary aggregate diameter of not more than 10 µm and a secondary aggregate particle specific surface area of 2 to 250 m$^2$/g. This fine powder can be suitably used in the fields of electronic materials, catalysts, powder metallurgy, pigments, and adsorbents.

PRIOR ART

As a method of the production of fine powders, an electrolytic method, an atomizing method and a mechanical milling method are conventionally known. Fine powders obtained by these methods still have a large particle diameter. Although it is possible to obtain "finer" fine powders by controlling the production conditions and/or by carrying out the classification, the fine powder formation has its limits, and causes a problem in productivity and economic performance.

For the production of "finer" fine particles, there is employed a thermal decomposition method, a gas-phase reduction method, a precipitation method, a sputtering method or an in-gas evaporation method. However, almost all of these methods require an apparatus of a large scale or sometimes use material(s) too highly toxic or too hazardous to handle.

Among the above methods, the process for the production of fine metal powders by the thermal decomposition of an organic acid metal salt is simple and has been conventionally applied to the production of catalysts. For example, a fine copper powder is produced by the thermal decomposition of copper formate, a fine nickel powder is produced by the thermal decomposition of nickel formate, and a fine silver powder is formed by the thermal decomposition of silver oxalate. However, the defect with this method is that it is difficult to obtain a fine powder having a uniform particle diameter, low aggregation properties and a large specific surface area.

SUMMARY OF THE INVENTION

It is an object of the present invention to provide a process for the production of a fine powder, by which fine metal or metal oxide powder having low aggregation properties can be produced economically and industrially.

It is another object of the present invention to provide a process for the production of a fine metal or metal oxide powder having a uniform particle diameter and a large specific surface area.

According to the present invention, there is provided a process for the production of a fine powder having a primary particle diameter of not more than 0.5 µm, an average secondary particle aggregate particle diameter of not more than 10 µm and a secondary aggregate particle specific surface area of 2 to 250 m$^2$/g, which comprises heating an organic acid metal salt in the presence of palladium at a temperature elevation rate of 0.5° to 20° C./minute and thermally decomposing the organic acid metal salt in the presence of the palladium in the temperature range of not higher than 400° C.

DETAILED DESCRIPTION OF THE INVENTION

Figure 1:
FIG. 1 is the transmission electron microscope photograph (×100,000) of a fine powder obtained in Example 2.

The organic acid metal salt used in the present invention preferably includes organic acid metal salts such as acetates, formates, oxalates and benzoates of metals selected from the group consisting of Mg, Ca, Sr, Ba, Cr, Mn, Fe, Co, Ni, Pd, Cu, Ag, Zn, Cd, In, Tl, Pb and Bi.

The organic acid metal salt can be selected from hydrates, dehydration products produced from the hydrates, and anhydrous salts. Of these organic acid metal salts, an anhydrous salt is preferred to obtain a fine powder having low aggregation properties, little residual skeleton of the crystal structure of the organic acid metal salt and a uniform particle size. Particularly preferred are a system which substantially does not contain water and an anhydrous salt which is directly obtained by the condensation, etc., of a solution of the organic acid metal salt.

In the present invention, palladium is allowed to be co-present with the above organic acid metal salt. Due to the co-presence of palladium, the thermal decomposition temperature is generally decreased from the thermal decomposition temperature of the organic acid metal salt in the absence of palladium approximately by 20° to 100° C., and remarkably, primary particles having a further smaller particle diameter are formed, or the particle diameter of aggregates formed of the primary particles is decreased.

The above palladium is usually used in the form of a palladium salt. The palladium salt is generally selected from palladium chloride, palladium acetate, palladium nitrate and palladium sulfate. In view of smallness of residual halogen, sulfur and other impurities, it is preferred to use organic acid salts which are decomposed at a relatively low temperature such as palladium acetate.

The palladium is allowed to be co-present with the organic acid metal salt by a method in which palladium (salt) is mechanically mixed with the organic acid metal salt to disperse it in, or attach it to, the organic acid metal salt, or by a method in which palladium salt is added in a step of producing the organic acid metal salt whereby palladium is included in a crystal of the organic acid metal salt. The inclusion of palladium in the crystal is preferred in view of achieving better thermal decomposability of the organic acid metal salt and obtaining a "finer" fine powder by the use of a smaller amount of palladium. It is preferred to use a crystal of an organic acid metal salt, which contains palladium in the range of 100 to 6,000 ppm by weight. In addition, a crystal containing more than 6,000 ppm by weight of palladium can be also used without any particular problem. That is, even if the palladium content is more than 6,000 ppm, the decomposition temperature is decreased. However, palladium is expensive, and the use thereof in such a large amount is not economical.

Table 1 shows the thermal decomposition characteristics of organic acid metal salts containing palladium and organic acid metal salts containing no palladium. In the preparation of data shown in Table 1, palladium was incorporated in a step of producing the metal salts of an organic acid, and palladium was included in the crystal structure of each of the metal salts of an organic acid. All the metal salts of an organic acid were anhydrous salts. The metal salts were measured for thermal decomposition characteristics in an inert gas (nitrogen current) atmosphere at a temperature elevation rate of 2° C./minute by TD/DTA (difference thermal) analysis/thermogravimetric analysis).

TABLE 1

(Thermal decomposition characteristics)

| Metal salt of organic acid | Pd content (weight ppm) | Thermal decomposition temperature (°C.) initiation | peak | termination | Decrease in thermal decomposition (°C.) |
|---|---|---|---|---|---|
| Anhydrous copper formate | 0 | 173 | 192 | 196 | — |
|  | 1,400 | 114 | 143 | 147 | 49 |
|  | 4,000 | 88 | 127 | 134 | 65 |
| Anhydrous nickel formate | 0 | 241 | 242 | 246 | — |
|  | 1,000 | 194 | 204 | 210 | 38 |
| Anhydrous cobalt formate | 0 | 268 | 274 | 282 | — |
|  | 1,000 | 194 | 204 | 216 | 70 |
| Magnesium acetate | 0 | — | 340 | — | — |
|  | 600 | — | 280 | — | 60 |
| Tin acetate (II) | 0 | — | 270 | — | — |
|  | 550 | — | 210 | — | 60 |
| Indium acetate | 0 | — | 240 | — | — |
|  | 700 | — | 190 | — | 50 |
| Nickel benzoate | 0 | — | 390 | — | — |
|  | 450 | — | 340 | — | 50 |
| Zinc formate | 0 | — | 290 | — | — |
|  | 300 | — | 250 | — | 40 |
| Tin oxalate | 0 | — | 365 | — | — |
|  | 400 | — | 320 | — | 45 |

The above Table 1 clearly shows that the decomposition initiation temperature, peak temperature (main decomposition temperature) and decomposition termination temperature of an organic acid metal salt containing palladium shift to a lower temperature as compared with an organic acid metal salt containing no palladium.

Table 2 shows the properties of fine powders obtained by the thermal decomposition of metal salts of an organic acid. The measurement of the properties was carried out under a nitrogen atmosphere at a temperature elevation rate of 2° C./minute and at a thermal decomposition temperature shown in Table 2. In addition, the detail data of cobalt formate.dihydrate are also described in Comparative Example 2.

TABLE 2

(properties of fine powders)

| Metal salt of organic acid | Pd content (ppm) | Thermal decomposition temperature (°C.) | Specific surface area (m²/g) | Aggregate particle diameter (μm) |
|---|---|---|---|---|
| Anhydrous copper formate | 0 | 200 | 2.0 | 17.6 |
|  | 600 | 130 | 62.0 | 6.6 |
| Nickel formate. dihydrate | 0 | 220 | 16.0 | 24.7 |
| Anhydrous nickel formate | 1,000 | 200 | 120.0 | 4.4 |
|  | 0 | 246 | 8.4 | 4.6 |
| Cobalt formate. dihydrate | 0 | 250 | 23.4 | 7.0 |
| Anhydrous cobalt formate | 600 | 250 | 34.3 | 2.9 |
|  | 0 | 280 | 28.0 | 3.6 |

Table 2 shows that, when organic acid metal salts containing palladium are used, the thermal decomposition is completed at a lower temperature and there are eventually formed fine powders having a larger specific surface area and a smaller aggregate particle diameter.

In the present invention, the organic acid metal salt may be thermally decomposed in an oxidative atmosphere in some cases, while the thermal decomposition is preferably carried out in a nonoxidative atmosphere under an atmospheric pressure or reduced pressure. In general, the thermal decomposition is carried out in a nonoxidative atmosphere under an atmospheric pressure, in which the thermal decomposition is easily operable. When the thermal decomposition is carried out under reduced pressure, the pressure is not more than 30 mmHg, preferably not more than 5 mm Hg. The temperature elevation rate is 0.5 to 20° C./minute, preferably 2° to 20° C./minute. When the temperature elevation rate exceeds 20° C./minute, primary particles and aggregate (secondary) particles are not uniform, and are large in size, and fusion of formed primary particles is promoted.

The temperature for the thermal decomposition is set at not more than 400° C. When this temperature exceeds 400° C., the same disadvantages as those caused when the temperature elevation rate exceeds 20° C./minute occur. The temperature for the thermal decomposition is preferably around a peak temperature of heat weight loss when an organic acid metal salt containing palladium is measured at a temperature elevation rate of 2° C./minute. The temperature for the thermal decomposition is in the range between the thermal decomposition peak temperature of an organic acid metal salt containing no palladium and a temperature which is lower than this thermal decomposition peak temperature by about 100° C. The temperature for the thermal decomposition is generally in the range of 130° to 300° C. The time for carrying out the thermal decomposition sufficiently at a peak temperature is not more than 3 hours, generally in the range of 1 to 60 minutes.

The so-obtained fine powder can be used as it is. When a fine powder having a particularly low content of impurities is required, it is preferred to employ a step of washing the fine powder with water or a solution of an acid or an alkali in an organic solvent, a step of mechanically milling the fine powder or a step of reducing the fine powder with hydrogen, hydrazine, etc., in a gaseous phase.

When a fine metal powder is produced in a nonoxidative atmosphere or under reduced pressure, the resultant metal powder that has a specific surface area of at least 20 m²/g is remarkable active. Therefore, such a fine metal powder may ignite or combust even at room temperature. In order to handle the fine metal powder stably in air, it is essentially required to cover the fine metal powder surface with a thin oxide layer in advance. For this purpose, it is generally preferred to gradually oxidize the metal fine powder under a nitrogen current containing a trace amount (1,000 to 2,000 ppm) of oxygen.

The particle diameter and specific surface area of a fine metal or metal oxide powder differ depending upon organic acids, metals and/or production conditions. Table 3 shows the particle diameters and specific surface areas of some fine powders.

TABLE 3

| Organic acid metal salt | Primary particle diameter | Specific surface area | Product (fine powder) |
|---|---|---|---|
| Anhydrous copper formate | not more than 0.1 μm | 3–100 m²/g | copper |

TABLE 3-continued

| Organic acid metal salt | Primary particle diameter | Specific surface area | Product (fine powder) |
| --- | --- | --- | --- |
| Anhydrous nickel formate | not more than 0.3 μm | 2-200 m$^2$/g | nickel |
| Anhydrous cobalt formate | not more than 0.1 μm | 10-80 m$^2$/g | cobalt |

The present invention will be described further in detail hereinafter. In Examples, "part" and "%" stand for "part by weight" and "% by weight".

EXAMPLE 1

200 Milliliters of methanol was added to 50 g of basic copper carbonate to form a slurry. 200 Milliliters of an acetone/methanol (80/20 by volume) containing 0.1 g of palladium acetate was added to 120 g of 88% formic acid to form a uniform formic acid solution. This uniform formic acid solution was added to the above slurry of the basic copper carbonate at room temperature, and the mixture was allowed to react at 65° C. for 30 minutes.

After the reaction, the reaction mixture was filtered while the temperature thereof was kept at 65° C., and the resultant cake was washed with 50 ml of methanol three times. Then, the washed cake was dried under reduced pressure at a temperature of 80° C. for 2 hours to give 60 g of anhydrous copper formate containing palladium. The content of palladium determined by inductively coupled plasma atomic emission spectroscopy (ICP) analysis was 600 ppm.

5 Grams of the above anhydrous copper formate containing palladium was placed in a reduced pressure dryer, and the dryer was flushed with a nitrogen gas twice. While a nitrogen gas was introduced, the anhydrous copper formate was heated at a temperature elevation rate of 3° C./minute. The anhydrous copper formate was thermally decomposed by keeping it at 130° C. for 1.0 hour.

The so-obtained fine copper powder was cooled to room temperature and taken out of the dryer. The fine copper powder (yield: 2.1 g) was formed of primary spherical ultrafine powders having a uniform primary particle diameter of less than 0.1 μm and had a specific surface area of 62 m$^2$/g and an average aggregate particle diameter of 6.6 μm.

The fine powder in this Example and those in other Examples which will be described later were measured for a primary particle diameter, an aggregate particle diameter and a specific surface area as follows.

1. Primary Particle Diameter

A fine powder was observed through a scanning electron microscope at a magnification of 20,000 to 50,000 diameters.

2. Aggregate Particle Diameter

A sample (50 mg±20 mg) was taken from a fine powder obtained by thermal decomposition, and placed in about 100 ml of pure water. A few drops of a surfactant were added, and the mixture was lightly stirred. The resultant mixture was placed in a laser diffraction type particle size distribution measuring apparatus (LA-500, supplied by K. K. Horiba Seisakusho) in which the ultrasonic dispersion treatment as a preliminary treatment for measurement was set for 5 minutes, and automatically measured.

3. Specific Surface Area

Measured by a porous membrane type specific surface area measurement method (BET method) using He/Ne gas.

COMPARATIVE EXAMPLE 1

Example 1 was repeated except that the anhydrous copper formate containing palladium was replaced with anhydrous copper formate containing no palladium, that the temperature for the thermal decomposition was changed to 200° C. and that the time for the thermal decomposition was changed to 90 minutes.

The so-obtained copper powder was formed of nearly spherical, uniform primary particles having a particle diameter of 0.3μ and had an average aggregate particle diameter of 17 μm and a specific surface area of 3 m$^2$/g.

EXAMPLE 2

200 Milliliters of methanol was added to 50 g of basic cobalt carbonate and 0.2 g of palladium acetate, and the mixture was stirred with a mixer for 3 minutes to form a slurry. Then, a formic acid solution containing 100 g of 90 formic acid and 50 ml of formic acid was added to the slurry at room temperature, and the mixture was allowed to react at 65° C. for 30 minutes. Immediately after the reaction, the reaction mixture was filtered while it was hot.

The resultant cake was washed with 50 ml of methanol three times, and dried under reduced pressure at 80° C. for 2 hours. The cake was cooled to room temperature and taken out to give 62 g of anhydrous cobalt formate. The palladium content determined by ICP was 1,000 ppm.

5 Grams of the above-obtained anhydrous cobalt formate was placed in a reduced pressure dryer, and thermally decomposed by heating it under a reduced pressure of 1 Torr at a temperature elevation rate of 2° C./minute and keeping it at 220° C. for 30 minutes.

The so-obtained fine powder was cooled to room temperature. Then, a nitrogen gas was introduced, and the fine powder was allowed to stand overnight.

The resultant cobalt powder had a primary particle diameter of about 20 nm (measured with a transmission electron microscope), a specific surface area of 54 m$^2$/g and an average aggregate particle diameter of 2.9 μm. FIG. 1 shows the photograph of the above-obtained fine powder taken through a transmission electron microscope (×100,000).

COMPARATIVE EXAMPLE 2

Figure 2:
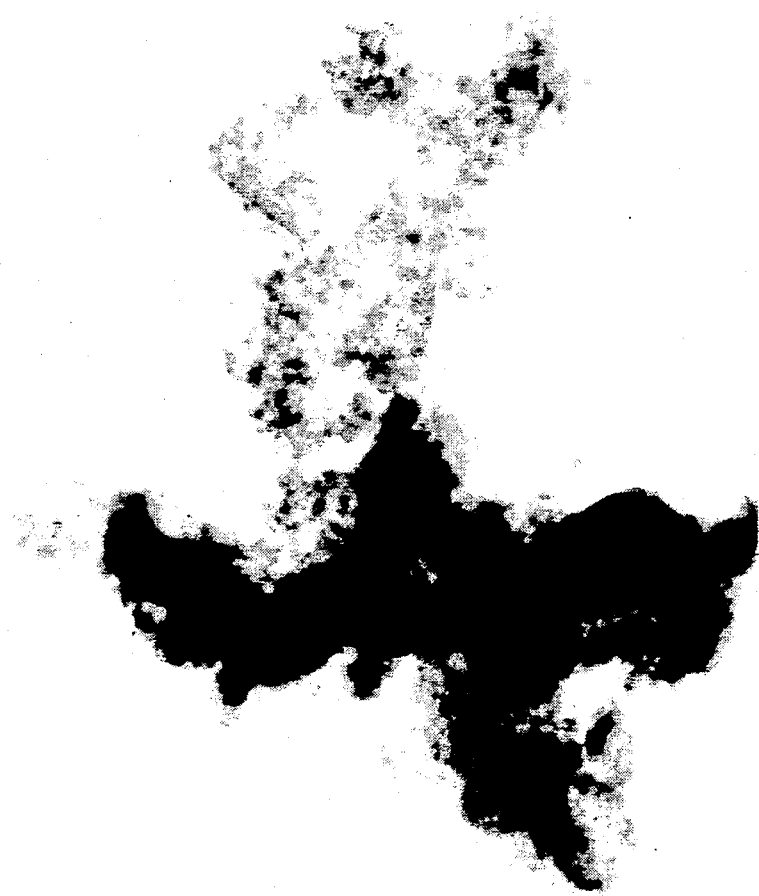
FIG. 2 is the transmission electron microscope photograph (×100,000) of a fine powder obtained in Comparative Example 2.

Example 2 was repeated except that 5 g of cobalt formate.dihydrate containing no palladium was used and that the heating temperature was changed from 220° C. to 250° C. The so-obtained fine cobalt powder had a specific surface area of 23.4 m$^2$/g and an average aggregate particle diameter of 7.0 μm. FIG. 2 shows the photograph of the above-obtained fine powder taken through a transmission electron microscope (×100,000).

EXAMPLE 3

200 Milliliters of methanol and 100 ml of acetone/methanol (volume ratio 8/2) solution containing 0.15 g of palladium acetate were added to 50 g of basic nickel carbonate, and the resultant mixture was stirred with a mixer to form a slurry. A formic acid solution containing 80 g of 88% formic acid and 100 ml of methanol was added to the slurry at room temperature, and the mixture was allowed to react at 65° C. for 30 minutes. Immediately after the reaction, the reaction mixture was filtered while it was hot.

The resultant cake was washed with 50 ml of methanol three times, and dried under reduced pressure at 80° C. for 2 hours. The cake was cooled to room temperature and taken out to give 60 g of anhydrous nickel formate. The palladium content determined by ICP was 600 ppm.

5 Grams of the above-obtained anhydrous nickel formate was placed in a reduced pressure dryer, and thermally decomposed by heating it under a reduced pressure of 1 Torr at a temperature elevation rate of 2° C./minute and keeping it at 250° C. for 30 minutes.

The so-obtained fine powder was cooled to room temperature, and then gradually oxidized for 2 hours by introducing a nitrogen gas containing 2,000 ppm of oxygen (whereby a very thin and dense oxide layer was formed on the powder particle surface). The resultant nickel powder (1.9 g) had a primary particle diameter of not more than 0.1 $\mu$m, a specific surface area of 120 m$^2$/g and an average aggregate particle diameter of 1.4 $\mu$m.

COMPARATIVE EXAMPLE 3

Example 2 was repeated except for the use of 5 g of nickel formate.dihydrate containing no palladium. The so-obtained fine powder had a specific surface area of 16 m$^2$/g and an average aggregate particle diameter of 24.7 $\mu$m. The primary particle diameter could not be distinguished through a scanning electron microscope.

EXAMPLE 4

5 Grams of the same anhydrous nickel formate containing palladium as that obtained in Example 3 was placed in a reduced pressure dryer, and heated under a reduced pressure of 1 Torr at a temperature elevation rate of 2° C./minute up to 60° C. Then, air was introduced, and the anhydrous nickel formate was kept at atmospheric pressure in the dryer, and taken out.

The resultant nickel powder (2.4 g) was a partially oxidized nickel powder and had a primary particle diameter of not more than 0.1 $\mu$m, a specific surface area of 15 m$^2$/g and an average aggregate particle diameter of 3 $\mu$m.

EXAMPLE 5

5 Grams of commercially available nickel oxalate.dihydrate and 0.01 g (900 ppm) of palladium acetate were fully mixed in a mortar.

The so-prepared mixture was placed in a reduced pressure dryer and heated under a reduced pressure of 1 mmHg at a temperature elevation rate of 2° C./minute up to 260° C. The mixture was kept in the dryer for 30 minutes, and then the resultant fine powder (1.5 g) was taken out.

The above-obtained fine powder was analyzed with X-ray to show that the product was nickel metal and had a primary particle diameter of not more than 0.1 $\mu$m, a specific surface area of 23 m$^2$/g and an average aggregate particle diameter of 6 $\mu$m.

COMPARATIVE EXAMPLE 4

Example 5 was repeated except that no palladium acetate was used and that the temperature for the thermal decomposition was set at 300° C. As a result, there was obtained a nickel powder having an aggregate particle diameter of 12 $\mu$m and a specific surface area of 10$^2$/g. The primary particle diameter could not be distinguished through a scanning electron microscope.

EXAMPLE 6

Example 5 was repeated except for the use of a mixture of 5 g of copper oxalate.½ hydrate with 0.01 g of palladium acetate.

The resultant copper powder (1.8 g) had a primary particle diameter of not more than 0.1 $\mu$m, a specific surface area of 7 m$^2$/g and an average aggregate particle diameter of 9 $\mu$m.

EXAMPLE 7

Nickel hydroxide (II) was added to an ethanol solution containing oxalic acid, and the mixture was allowed to react under a reflux of ethanol to prepare anhydrous nickel oxalate.

Then, Example 5 was repeated except for the use of a mixture of 5 g of the above anhydrous nickel oxalate with 0.01 g of palladium acetate.

The resultant copper powder (1.9 g) had a primary particle diameter of not more than 0.1 $\mu$m, a specific surface area of 24 m$^2$/g and an average aggregate particle diameter of 1.2 $\mu$m.

EXAMPLE 8

5 Grams of a mixture of an organic acid metal salt with palladium, or an organic acid metal salt, was placed in a reduced pressure dryer, and heated under a reduced pressure of 1 mmHg under the conditions shown in Table 3 and kept in the dryer at a thermal decomposition temperature shown in Table 3. Then, the resultant product was cooled to room temperature in the dryer, and a nitrogen gas was introduced. Then, the resultant fine powder was taken out of the dryer. Table 3 shows the properties of the so-obtained fine powders.

TABLE 4

|  | Organic acid metal salt | Pd content (ppm) | Thermal decomposition | | | Specific surface area (m$^2$/g) | Aggregate particle diameter ($\mu$m) | Primary particle diameter ($\mu$m) | Remarks |
|---|---|---|---|---|---|---|---|---|---|
|  |  |  | temperature, (°C.) | time, (min) | elevation (°C./min) |  |  |  |  |
| Ex-a | Silver acetate | 3,500 | 260 | 30 | 2 | 4.5 | 1.3 | 0.2 |  |
| Ex-b | " | 3,500 | 300 | 30 | 2 | 4.5 | 1.3 | 0.2 |  |
| CEx-a | " | 0 | 300 | 30 | 2 | 1.4 | 16.0 | 0.2 |  |
| CEx-b | " | 0 | 300 | 30 | 20 | 0.5 | 32.0 | 0.4 |  |
| Ex-c | Anhydrous magnesium acetate | 600 | 280 | 30 | 2 | 240 | 5.0 | 0.1 or less | oxide |
| CEx-c | Magnesium acetate. tetrahydrate | 0 | 340 | 30 | 2 | 190 | 16.0 | 0.1 or less | oxide |
| Ex-d | Manganese acetate. tetrahydrate | 1,000 | 280 | 30 | 2 | 42 | 2.8 | 0.1 or less | oxide |
| CEx-d | Manganese acetate. | 0 | 280 | 30 | 2 | 33 | 13.4 | 0.1 or less | oxide |

TABLE 4-continued

| | Organic acid metal salt | Pd content (ppm) | Thermal decomposition temperature, (°C.) | time, (min) | elevation (°C./min) | Specific surface area (m²/g) | Aggregate particle diameter (μm) | Primary particle diameter (μm) | Remarks |
| --- | --- | --- | --- | --- | --- | --- | --- | --- | --- |
| | tetrahydrate | | | | | | | | |
| Ex-e | Anhydrous iron formate | 1,000 | 300 | 30 | 2 | 45 | 1.5 | 0.1 or less | oxide |
| CEx-e | Anhydrous iron formate | 0 | 300 | 30 | 2 | 45 | 20.0 | 0.1 or less | oxide |
| Ex-f | Cobalt acetate. tetrahydrate | 1,900 | 300 | 60 | 2 | 58 | 2.0 | 0.1 or less | |
| CEx-f | Coblat acetate. tetrahydrate | 0 | 300 | 60 | 2 | 42 | 14.1 | 0.1 or less | |
| Ex-g | Anhydrous cobalt oxalate | 1,900 | 300 | 30 | 2 | 42 | 4.2 | 0.1 or less | |
| CEx-g | Anhydrous cobalt oxalate | 0 | 300 | 30 | 2 | 15.3 | 14.4 | 0.1 or less | |

As has been clear from the above Detailed Description, Examples and Comparative Examples, fine powders or ultrafine powders having low aggregation properties and a large specific surface area can be produced simply, economically and easily at a low thermal decomposition temperature according to the present invention. Thus, the present invention provides a novel and practical process for the industrial production of fine powders, which process has great industrial significance.

What is claimed is:

1. A process for the production of a fine powder having a primary particle diameter of not more than 0.5 μm, an average secondary aggregate particle diameter of not more than 10 μm and a secondary aggregate particle specific surface area of 2 to 250 m²/g, which comprises heating an organic acid metal salt in the presence of a sufficient amount of palladium to lower the thermal decomposition temperature thereof at a temperature elevation rate of 0.5° to 20° C./minute and thermally decomposing the organic acid metal salt in the presence of the palladium at a temperature range of not higher than 400° C.

2. A process according to claim 1, wherein the organic acid metal salt is thermally decomposed at a temperature in the range of from 100° C. lower than a thermal decomposition temperature of an organic acid metal salt containing no palladium to said thermal decomposition temperature.

3. A process according to claim 1, wherein the organic acid metal salt is at least one member selected from the group consisting of acetates, formates, oxalates and benzoates of metals selected from Mg, Ca, Sr, Ba, Cr, Mn, Fe, Co, Ni, Pd, Cu, Ag, Zn, Cd, In, Tl, Pb and Bi.

4. A process according to claim 1, wherein the organic acid metal salt is an anhydrous salt.

5. A process according to claim 1, wherein the palladium is present in an amount of 100 to 6,000 ppm by weight based on the organic acid metal salt.

6. A process according to claim 5, wherein the organic acid metal salt is an anhydrous copper formate and a formed fine copper powder has a primary particle diameter of not more than 0.1 μm or a secondary aggregate particle specific surface area of 3 to 100 m²/g.

7. A process according to claim 5, wherein the organic acid metal salt is an anhydrous nickel formate and a formed fine nickel powder has a primary particle diameter of not more than 0.3 μm or a secondary aggregate particle specific surface area of 2 to 200 m²/g.

8. A process according to claim 5, wherein the organic acid metal salt is an anhydrous cobalt formate and a formed fine cobalt powder has a primary particle diameter of not more than 0.1 μm or a secondary aggregate particle specific surface area of 10 to 80 m²/g.

9. A process according to claim 5, wherein the organic acid metal salt is at least one selected from the group consisting of iron acetate, cobalt acetate, nickel acetate, copper acetate and silver acetate.

* * * * *

UNITED STATES PATENT AND TRADEMARK OFFICE
CERTIFICATE OF CORRECTION

PATENT NO. : 5,250,101
DATED : October 5, 1993
INVENTOR(S) : Toshio Hidaka, et al It is certified that error appears in the above-indentified patent and that said Letters Patent is hereby corrected as shown below:

Column 9, line 41, delete "range".

Signed and Sealed this

Twenty-first Day of June, 1994

*Attest:*

BRUCE LEHMAN

*Attesting Officer*     *Commissioner of Patents and Trademarks*